United States Patent [19]

Jolley et al.

[11] Patent Number: 4,963,282

[45] Date of Patent: Oct. 16, 1990

[54] LIQUID COMPOSITIONS CONTAINING THIOCARBAMATES

[75] Inventors: Scott T. Jolley; Betsy J. Butke, both of Mentor, Ohio

[73] Assignee: The Lubrizol Corporation, Wickliffe, Ohio

[21] Appl. No.: 350,600

[22] Filed: May 11, 1989

[51] Int. Cl.$^5$ ...................... C09K 5/04; C10M 105/52
[52] U.S. Cl. .......................... 252/67; 252/68
[58] Field of Search .................................. 252/67, 68

[56] References Cited

U.S. PATENT DOCUMENTS

| | | | |
|---|---|---|---|
| 4,248,726 | 2/1981 | Uchinuma et al. | 252/52 A |
| 4,267,064 | 5/1981 | Sasaki et al. | 252/52 A |
| 4,428,854 | 1/1984 | Enjo et al. | 252/69 |
| 4,431,557 | 2/1984 | Shimizu et al. | 252/52 A |
| 4,454,052 | 6/1984 | Shoji et al. | 252/68 |
| 4,559,154 | 12/1985 | Powell | 252/69 |
| 4,755,316 | 7/1988 | Magid et al. | 252/68 |
| 4,758,362 | 7/1988 | Butke | 252/47.5 |

FOREIGN PATENT DOCUMENTS 73087   5/1982   Japan ..................... 252/67

*Primary Examiner*—Olik Chaudhuri
*Assistant Examiner*—Ellen McAvoy
*Attorney, Agent, or Firm*—Robert A. Franks; Frederick D. Hunter; Forrest L. Collins

[57] ABSTRACT

A liquid composition is described which comprises
(A) a major amount of at least one fluorine containing hydrocarbon containing one or two carbon atoms; and
(B) a minor amount of at least one soluble organic lubricant comprising at least one organic thiocarbamate characterized by the formulae $$R_1R_2NC(X)SC(R_3R_4)[C(H)(R_5)]_aZ, \text{ or} \quad (I)$$

$$[R_1R_2NC(X)SC(R_3R_4)[C(H)(R_5)]_aC(X)A]_2Z' \quad (II)$$

wherein $R_1$ and $R_2$ are each independently lower alkyl, aryl, aralkyl or together form a heterocyclic group in which the ring is completed through the nitrogen;
X is O or S;
A is O, S or NR;
R is H or a lower alkyl group;
$R_3$, $R_4$ and $R_5$ are each independently H, lower alkyl or aryl groups;
a is 0 or 1;
Z is —CN, —S(O)$R_6$, —S(O)O$R_6$, —S(O)$_2R_6$, —S(O)$_2$O$R_6$, or —C(O)Y;
$R_6$ is H, alkyl or aralkyl;
Y is H, —OH, —$R_7$, —O$R_7$, —O$R_8$OH, or —N$R_9R_{10}$;
$R_7$ is an alkyl, aryl or aralkyl group;
$R_8$ is an alkylene group of 1 to about 7 carbon atoms;
$R_9$ and $R_{10}$ are each independently H, alkyl, hydroxyalkyl, cycloaliphatic, or together form cyclic group in which the ring is completed through the nitrogen atom; and
$Z'$ is —$R_8$— or —$R_8$—A—$R_8$—.

Liquid compositions also are described wherein the fluorine-containing hydrocarbons also contain other halogen such as chlorine. The liquid compositions are useful particularly as refrigeration liquids in refrigerators and air-conditioners including auto, home and industrial air-conditioners.

24 Claims, No Drawings

4,963,282

LIQUID COMPOSITIONS CONTAINING THIOCARBAMATES

FIELD OF THE INVENTION

This invention relates to liquid compositions comprising a major amount of at least one fluorine-containing hydrocarbon, and a minor amount of at least One lubricant. More particularly, the invention relates to liquid compositions useful as refrigeration liquids.

BACKGROUND OF THE INVENTION

Chlorofluorocarbons, generally referred to in the industry as CFCs, have been widely used as propellants in aerosols. The use in aerosols has been diminishing in recent years as a result of demands of environmentalists for the reduction if not a complete ban on the use of CFCs. CFCs have a detrimental effect on the stratosphere's ozone layer. CFCs also have been used because of their unique combination of properties as refrigerants, foam-blowing agents, and specialty solvents within the electronics and aerospace industries. Examples of CFCs which have been utilized for these purposes include CFC-11 which is chlorotrifluoromethane, CFC-12 which is dichlorodifluoromethane, and CFC-113 which is 1,2,2-trifluoro-1,1,2-trichloroethane.

Since 1976, when the aerosol industry began to feel the pressure to reduce if not eliminate the use of CFCs, the aerosol industry has progressively moved toward the substitution of hydrocarbon propellants for CFC propellants. The hydrocarbons, such as butane, are readily available and inexpensive, and the quality of the final product generally has been unaffected by the substitution of propellants. However, the problem of finding a safe replacement for CFC refrigerants and foam-blowing agents has been more difficult to solve. Several replacement candidates have been suggested as alternatives to the fully halogenated hydrocarbons, and these include halogenated hydrocarbons containing at least some hydrogen atoms such as HCFC-22 which is difluorochloromethane, HCFC-123 which is 1,1-dichloro-2,2,2-trifluoroethane, HFC-134a which is 1,1,1,2-tetrafluoroethane and HCFC-141b which is 1,1-dichloro-1-fluoroethane.

The ozone depletion potential of these proposed substitutes is significantly less than the ozone depletion potential of the previously used CFCs. The ozone depletion potential is a relative measure of the capability of the material to destroy the ozone layer in the atmosphere. It is a combination of the percentage by weight of chlorine (the atom that attacks the ozone molecule) and the lifetime in the atmosphere. HCFC-22 and HFC-134a generally are recommended as being candidates in refrigerant applications, and HFC-134a is particularly attractive because its ozone depletion potential has been reported as being zero.

In order for any of the replacement materials to be useful as refrigerants, the materials must be compatible with the lubricant utilized in the compressor. The presently used refrigerants such as CFC-12 are readily compatible with mineral lubricating oils which are utilized as the lubricant in air-conditioner compressors. The above-described refrigerant candidates, however, have different solubility characteristics than the refrigerants presently in use. For example, mineral lubricating oil is incompatible (i.e., insoluble) with HFC134a. Such incompatibility results in unacceptable compressor life in compression-type refrigeration equipment including refrigerators and air-conditioners including auto, home and industrial air-conditioners. The problem is particularly evident in automotive air-conditioning systems since the compressors are not separately lubricated, and a mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

Compositions comprising a tetrafluoroethane and polyoxyalkylene glycols are discussed in U.S. Pat. No. 4,755,316. The compositions are useful in refrigeration systems. Refrigeration oils are described in U.S. Pat. Nos. 4,248,726 and 4,267,064 which comprise mixtures of a polyglycol and 0.1 to 10% of glycidyl ether type epoxy compounds, or epoxidized fatty acid monoesters, and optionally, epoxidized vegetable oil. The lubricating oils are reported to be useful in refrigerators using a halogen-containing refrigerant such as Freons 11, 12, 13, 22, 113, 114, 500 and 502 (available from DuPont), and in particular with Freon 12 or 22.

U.S. Pat. No. 4,431,557 describes fluid compositions comprised of a fluoro- and chloro-containing refrigerant, a hydrocarbon oil, and an alkylene oxide additive compound which improves the thermal resistance of the oil in the presence of the refrigerant. Examples of hydrocarbon oils include mineral oil, alkyl benzene oil, dibasic acid ester oil, polyglycols, etc. The composition may contain other additives including load-carrying additives such as phosphorus acid esters, phosphoric acid esters, organic sulfur compounds, etc. Examples of fluorocarbon refrigerants include R-11, R-12, R-113, R-114, R-500, etc.

U.S. Pat. No. 4,428,854 describes absorption refrigerant compositions for use in refrigeration systems comprising 1,1,1,2-tetrafluoroethane and an organic solvent capable of dissolving the ethane. Among the solvents disclosed are organic amides, acetonitrile, N-methyl pyrroles, N-methyl pyrrolidine, N-methyl-2-pyrrolidone, nitromethane, various dioxane derivatives, glycol ethers, butyl formate, butyl acetate, diethyl oxalate, diethyl malonate, acetone, methyl ethyl ketone, other ketones and aldehydes, triethyl phosphorio triamide, triethylene phosphate, triethyl phosphate, etc.

Stabilized absorption compositions comprising (a) a halogenated hydrocarbon refrigerant, (b) a liquid absorbent of a polyethylene glycol methyl ether, and (c) at least one stabilizer are described in U.S. Pat. No. 4,454,052. Examples of stabilizers include phosphate esters, epoxy compounds, and organotin compounds. The polyethylene glycol methyl ether-type compounds are of the general formula

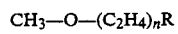

$$CH_3-O-(C_2H_4)_nR$$

wherein n is an integer of 1 to 6, and R is H, CH₃— or CH₃CO—. A variety of halogenated hydrocarbons are described including 1,1,-difluoromethane, 1,1,1,2-tetrafluoroethane, etc.

U.S. Pat. No. 4,559,154 relates to absorption heat pumps utilizing as working fluid, a saturated fluorohydrocarbon or fluorohydrocarbon ether having from 3 to 5 carbon atoms. Solvents reported to be useful with such fluorohydrocarbons include ethers such as tetraglyme, amides which can be lactams such as the N-alkyl pyrrolidones, sulfonamides and ureas including cyclic ureas.

SUMMARY OF THE INVENTION

A liquid composition is described which comprises
(A) a major amount of at least one fluorine containing hydrocarbon containing one or two carbon atoms; and
(B) a minor amount of at least one soluble organic lubricant comprising at least one organic thiocarbamate characterized by the formulae

  (I)

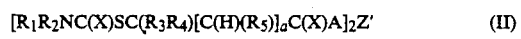  (II)

wherein $R_1$ and $R_2$ are each independently lower alkyl, aryl, aralkyl or together form a heterocyclic group in which the ring is completed through the nitrogen;
X is independently O or S;
A is O, S or NR;
R is H or a lower alkyl group;
$R_3$, $R_4$ and $R_5$ are each independently H, lower alkyl or aryl groups;
a is 0 or 1;
Z is —CN, —S(O)R₆, —S(O)OR₆, —S(O)₂R₆, —S(O)₂OR₆, or —C(O)Y;
R₆ is H, alkyl or aralkyl;
Y is H, —OH, —R₇, —OR₇, —OR₈OH, or —NR₉R₁₀;
R₇ is an alkyl, aryl or aralkyl group;
R₈ is an alkylene group of 1 to about 7 carbon atoms;
R₉ and R₁₀ are each independently H, alkyl, hydroxyalkyl, cycloaliphatic, or together form a cyclic group in which the ring is completed through the nitrogen atom; and
Z' is —R₈— or —R₈—A—R₈—.

Liquid compositions also are described wherein the fluorine-containing hydrocarbons also contain other halogen such as chlorine. The liquid compositions are useful particularly as refrigeration liquids in refrigerators and air-conditioners including auto, home and industrial air-conditioners.

DESCRIPTION OF THE PREFERRED EMBODIMENTS

Throughout this specification and claims, all parts and percentages are by weight, temperatures are in degrees Celsius, and pressures are at or near atmospheric pressure unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, hydrocarbylene, alkylene, alkyl, alkenyl, alkoxy, and the like, is intended to describe such groups which contain a total of up to 7 carbon atoms.

When a compound or component is indicated herein as being "soluble", the compound or component is soluble in the liquid compositions of the invention comprising the fluorine-containing hydrocarbon and the lubricant. For example, a compound or component is considered "soluble" so long as it is soluble in the liquid compositions, even though it may be insoluble in the fluorine-containing hydrocarbon per se.

(A) Fluorine-Containing Hydrocarbon

The liquid compositions of the present invention comprise a major amount of at least one fluorine-containing hydrocarbon. That is, the fluorine-containing hydrocarbons contain at least one C-H bond as well as C—F bonds. In addition to these two essential types of bonds, the hydrocarbon also may contain other carbon-halogen bonds such as C—Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons. The hydrocarbons containing chlorine as well as fluorine and hydrogen are referred to as chlorofluorohydrocarbons. The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering, pp. 33–34, July, 1988.

Examples of other fluorine-containing hydrocarbons which may be useful in the liquid compositions of the present invention include trifluoromethane (HFC-23), 1,1,1-trifluoroethane (HFC-143a), 1,1-difluoroethane (HFC-152a), 2-chloro-1,1,1,2-tetrafluoroethane (HCFC-124), 1-chloro-1,1,2,2-tetrafluoroethane (HCFC-124a), 1-chloro-1,1-difluoroethane (HCFC-142b), and 1,1,2,2-tetrafluoroethane (HFC-134). In the refrigerant art, the fluorohydrocarbons are often identified merely with the prefix "R" in place of the above letters. For example HFC-23 is R-23, HCFC-124 is R-124, etc.

In general, fluorine-containing hydrocarbons which are useful as refrigerants are fluoromethanes and fluoroethanes boiling at a relatively low temperature at atmospheric pressure, e.g., below 30° C. Mixtures of fluorine-containing hydrocarbons may be used, and the amount of each fluorohydrocarbon in the mixture may be varied as desired. Examples of fluorohydrocarbon mixtures useful as (A) include: 142(b)/22; 134(a)/23; 22/124/152(a), etc. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise from about 50% to about 99% by weight of the fluorine-containing hydrocarbon. In another embodiment, the liquid compositions contain from about 70% to about 99% by weight of the fluorine-containing hydrocarbon.

(B) Soluble Organic Lubricant

In addition to the fluorine-containing hydrocarbons described above, the liquid compositions of the present invention also contain a minor amount of at least one organic thiocarbamate. In one embodiment, the organic thiocarbamate lubricant is characterized by the formula

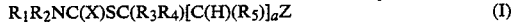
$$R_1R_2NC(X)SC(R_3R_4)[C(H)(R_5)]_aZ \qquad (I)$$

wherein $R_1$ and $R_2$ are each independently lower alkyl, aryl, aralkyl, or together form a heterocyclic group in which the ring is completed through the nitrogen;

$R_3$, $R_4$ and $R_5$ are each independently H, lower alkyl or aryl groups;

a is 0 or 1; and

Z is —CN, —S(O)R_6, —S(O)OR_6, —S(O)_2R_6, —S(O)_2OR_6, or —C(O)Y;

$R_6$ is H, alkyl or aralkyl;

Y is H, —OH, $R_7$, —OR_7, —OR_8OH or —NR_9R_{10};

$R_7$ is an alkyl, aryl or aralkyl group;

$R_8$ is an alkylene group of 1 to about 7 carbon atoms; and $R_9$ and $R_{10}$ are each independently H, alkyl, hydroxyalkyl, cycloaliphatic or together form a cyclic group in which the ring is completed through the nitrogen atom.

A preferred group of compounds within the dithiocarbamates of Formula I includes compounds where X is S, $R_3$, $R_4$ and $R_5$ are H or lower alkyl groups, a is 1 and Z is —C(O)Y wherein Y is —OH, —$R_7$, —OR_7, —OR_8OH or —NR_9R_{10}, and $R_7$, $R_8$, $R_9$ and $R_{10}$ are as defined above.

Another preferred embodiment of dithiocarbamates is defined by Formula I wherein X is S, $R_3$ and $R_4$ are H or methyl, and Y is OH, OR_7 wherein $R_7$ is methyl or ethyl, OR_8OH wherein $R_8$ is an alkylene group of from 1 to about 4 carbon atoms, and NR_9R_{10} wherein $R_9$ and $R_{10}$ are H.

In another preferred embodiment, the dithiocarbamates (B) are characterized by the formula

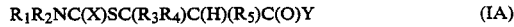
$$R_1R_2NC(X)SC(R_3R_4)C(H)(R_5)C(O)Y \qquad (IA)$$

wherein $R_1$ and $R_2$ are each independently lower alkyl or hydroxyalkyl groups or together form a heterocyclic group in which the ring is completed through the nitrogen;

X is O or S;

$R_3$, $R_4$ and $R_5$ are each independently H or lower alkyl groups;

Y is H, —OH, —$R_7$, —OR_7, —OR_8OH, or —NR_9R_{10};

$R_7$ is a lower alkyl group;

$R_8$ is an alkylene group of 1 to about 7 carbon atoms;

$R_9$ and $R_{10}$ are each independently H, alkyl, hydroxyalkyl, cycloaliphatic, or together form cyclic group in which the ring is completed through the nitrogen atom.

The dithiocarbamates also may be further characterized by the formula

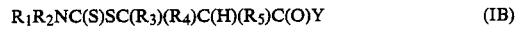
$$R_1R_2NC(S)SC(R_3)(R_4)C(H)(R_5)C(O)Y \qquad (IB)$$

wherein $R_1$ and $R_2$ are each independently lower alkyl groups;

$R_3$, $R_4$ and $R_5$ are each independently H or lower alkyl groups;

Y is —OR_7, —OR_8OH, or —NR_9R_{10};

$R_7$, $R_9$ and $R_{10}$ are each independently lower alkyl or hydroxyalkyl groups; and $R_8$ is an alkylene group of 1 to about 7 carbon atoms.

Thiocarbamates of the type characterized by Formulae I, IA and IB can be prepared from an amine, carbon disulfide or carbonylsulfide or source materials for these reactants and a reactant containing an activated, ethylenically-unsaturated bond, or an alpha-chloro or alpha-bromo carboxylic acid or derivative thereof. The reaction can be conducted in one or two steps. In one embodiment, all of the reactants are charged to a reactor and then reacted in one step. These reactants are charged to a reactor and stirred without heating since the reaction is exothermic. Once the reaction reaches the temperature of the exotherm, the reaction mixture is maintained at this temperature to insure a complete reaction, followed by the removal of volatiles under reduced pressure. The mixture is filtered, and the final product is obtained in high yield.

The two-step reaction involves reacting the amine with the carbon disulfide or carbonylsulfide to form a thiocarbamate intermediate. The intermediate then can be reacted either with the activated alpha-olefin or an alpha-halo acid, ester, etc., to form the thiocarbamate of Formula I.

The amine reactant may be represented by the formula $$R_1R_2NH \tag{III}$$

wherein $R_1$ and $R_2$ are each independently lower alkyl, aryl, aralkyl, or together form a heterocyclic group in which the ring is completed through the nitrogen atom. Specific amines which have been found to be useful within the scope of the present invention include dimethylamine, diethylamine, dipropylamine, dibutylamine, diamylamine, dihexylamine and diheptylamine. Also, there may be mentioned diphenylamine, dibenzylamine and the like. Furthermore, non-symmetric amines such as N-methylethylamine, N-ethylbutylamine, N-ethylamylamine and the like may be found to be useful within the scope of the present invention. Likewise, N-amylaniline and the like may be used.

Among the suitable heterocyclics are aziridines, azetidines, azolidines, pyrrolidine, pyridine, di-, and tetra-hydropyridines, pyrroles, indoles, quinoline, morpholine, picolines, piperidine and the like. Mixtures of two or more of these heterocyclic amines can be used. Typical heterocyclic amines are the saturated 5- and 6-membered heterocyclic amines.

Preferably the amines (III) are dialkyl amines wherein the alkyl groups are lower alkyl groups, and particularly preferred alkyl groups are methyl, ethyl, propyl, and butyl. Specific examples of amines III include: di-n-butyl amine; diethylamine; etc.

With respect to the reactants containing an activated, ethylenically unsaturated bond, these reactants may be illustrated by the following formula:

$$R_3R_4C=C(R_5)Z \tag{IV}$$

wherein $R_3$, $R_4$, $R_5$ and Z are as defined with regard to Formula I.

As specific species encompassed by the above Formula IV, there may be mentioned methylacrylate, ethylacrylate, 2-ethylhexylacrylate, 2-hydroxyethylacrylate, ethylmethacrylate, 2-hydroxyethylmethaorylate, 2-hydroxypropylmethacrylate, 2-hydroxypropylacrylate, acrylamide, methacrylamide, ethacrylamide, N-(2-hydroxyethyl)acrylamide, N-(2-hydroxymethyl)-methacrylamide, acrylonitrile, methyl vinyl sulfone, acrolein, methyl vinyl ketone, ethyl vinyl ketone, ethyl vinyl sulfone, etc.

Alternatively, the reactant may be an alpha halo acid, ester, aldehyde, ketone, nitrile, sulfonyl, sulfinyl compound, etc., such as represented by Formula V $$R_3R_4C(X')Z \tag{V}$$

wherein $R_3$, $R_4$ and Z are as defined in Formula I, and X' is a halogen, particularly chlorine or bromine. Specific examples of such reactants include alpha-chloroacetic acid, alpha-bromoacetic acid, alpha-chloroacetic acid ethyl ester, 2-chloropropionic acid, 2-bromopropionic acid, 2-chloropropionic acid methyl ester, 2-chloron-N-butyric acid, 2-bromohexanoic acid, chloroacetonitrile, bromoacetonitrile, etc.

The relative amounts of the reactants, discussed above, used to prepare the carbamate compounds of Formula I is not particularly critical. The charge ratios to the reactor can vary over a wide range where economics and the amount of the product desired are controlling factors. Thus, the charge ratio of the amine (III) to the $CS_2$ or COS reactant to the ethylenically unsaturated reactant (IV) or alpha-halo reactant (V) may vary 5:1:1 to 1:5:1 to 1:1:5. As a most preferred embodiment, the charge ratios of these reactants will be 1:1:1.

The thiocarbamate lubricants (B) used in the compositions of the present invention may also be characterized by the formula $$[R_1R_2NC(X)SC(R_3R_4)[C(H)(R_5)]_aC(X)A]_2Z' \tag{II}$$

wherein $R_1$, $R_2$, $R_3$, $R_4$, $R_5$, X, and a are as defined in Formula I; A is O, S or NR where R is H or a lower alkyl; and Z' is $-R_8-$ or $-R_8-A-R_8-$, wherein $R_8$ is an alkylene group of 1 to about 7 carbon atoms.

The carbamates of the type represented by Formula II where a=1 can be prepared by reacting an amine as represented by the formula $$R_1R_2NH \tag{III}$$

as described previously, carbon disulfide or carbonylsulfide or source materials for these reactants, and a reactant containing an activated, ethylenically-unsaturated bond such as represented by Formula VI $$[R_3R_4C=C(R_5)C(X)A]_2Z' \tag{VI}$$

wherein $R_3$, $R_4$, $R_5$, X, A, and Z' are as defined in Formula II above. Specific examples of such reactants include N,N'-methylenebisacrylamide, N,N'-methylenebismethacrylamide, dimethylene ether bisacrylamide, etc.

The thiocarbamates of Formula II wherein a=0 can be prepared by reacting an amine of Formula III with carbon disulfide or carbonylsulfide or source materials for these reactants, and an alpha-halogen-containing compound of the general formula $$[R_3R_4C(X')C(X)A]_2 \tag{VII}$$

wherein $R_3$, $R_4$, A, X and Z' are as described in Formula II above, and X' is a halogen, particularly chlorine or bromine. Preferably $R_3$ and $R_4$ are H, and Z' is $-R_8-$. Specific examples of such reactants include:

$$[ClCH_2C(O)O]_2CH_2,$$

$$[ClCH_2C(O)N(H)]_2CH_2,$$

$$[CH_3CH(Cl)C(O)O]_2CH_2, \text{ etc.}$$

The relative amounts of reactants used to form the thiocarbamates of Formula II can be varied over a wide range. For example, the charge ratio of the amine: $CS_2$ or COS: ethylenically unsaturated or halogen-containing reactant may vary from 5:1:1 to 1:5:1 to 1:1:5. In one preferred embodiment for preparing thiocarbamates of Formula II, the ratio is 2:2:1 when the third reactant is a bis-olefin such as N,N'-methylenebisacrylamide.

The reaction between the amine (III), $CS_2$ or COS and unsaturated reactants IV and VI or the halogen-containing reactants V and VII is generally exothermic and thus only slight heating may be applied. The reaction is conveniently conducted at from 25° C. to about 100° C. The reaction can be carried out in the presence or absence of a solvent. Desirably, the reaction is conducted in a solvent such as a hydrocarbon (toluene, xylene, hexane, heptane, kerosene, etc.); an alcohol such as methanol, ethanol, butanol, etc.; or a chlorohydrocarbon such as chloroform, carbon tetrachloride, etc. The reaction time is generally brief, and although dependent on temperature, is generally completed in one or two hours or less.

The thiocarbamates of Formula II also can be prepared by coupling thiocarbamates of the type represented by Formula I when Z is a group containing a reactive hydrogen such as —COOH, CON(R$_9$)H, —C-(O)OCH$_2$H, —SO$_2$H, etc. In one embodiment, these compounds are coupled by reacting them with an aldehyde or ketone of the following formula $$R_{11}C(O)R_{12} \qquad (VIII)$$

wherein R$_{11}$ and R$_{12}$ independently can be hydrogen, an alkyl group having from 1 to 12 carbon atoms, phenyl, or an alkyl-substituted phenyl having from 7 to 12 carbon atoms. Desirably the coupling agent is an aldehyde, i.e., R$_{11}$ is H, having a total of 1 to 3 carbon atoms therein. Formaldehyde and paraformaldehyde are highly preferred and the use of these coupling agents can result in methylene and di-methylene ether coupling groups.

The coupling reaction desirably takes place in the presence of strong mineral or organic acids such as HCl, H$_2$SO$_4$, H$_3$PO$_4$, CH$_3$SO$_3$H, p-toluenesulfonic acid, and the like. The amount of the acid catalyst is generally from about 0.3 to about 1.5% by weight, desirably from about 0.8 to about 1.2%, and preferably from about 0.9 to about 1.1% by weight based upon the weight of the total product formed. Although lesser amounts of catalyst can be utilized, the reaction is generally slower and a smaller amount of the desired product is formed. The reaction with an aldehyde or ketone initially takes place at a temperature of from about 80° C. to about 120° C. and desirably from about 80° C. to about 100° C. in an inert atmosphere. The final reaction temperature is generally higher as from about 100° C. to about 150° C. and desirably from about 125° C. to about 135° C.

Alternatively, if one wishes to stop at the intermediate carbinol stage, (e.g., —C(O)CH$_2$OH) the reaction between the amine (III) and the olefinic reactant (IV) is best carried out using basic catalysts, i.e., NaHCO$_3$, KHCO$_3$, Na$_2$CO$_3$, K$_2$CO$_3$, NaOH, KOH, etc. This reaction mixture can be neutralized with acid and heated to remove water to form an ether linkage (e.g. —CH$_2$O—CH$_2$—); reacted with H$_2$S, NaHS or Na$_2$S or other source of divalent sulfur to form a thio linkage (e.g., —CH$_2$SCH$_2$—); or, NH$_3$ or R''NH$_2$ where R'' is alternatively H, alkyl of 1–60 carbon atoms, aryl, alkyl substituents, aryl or aryl-substituted alkyl of 6–30 carbon atoms or acyl of 1–22 carbon atoms to form the amino linkage (e.g., —CH$_2$N(R'')CH$_2$—).

The amount of thiocarbamate I reacted with coupling agent (VIII) is from about 0.3 to about 3.0 moles utilized per mole of said agent (VIII) with a 2:1 molar ratio being preferred. The coupler may be a mixture of different couplers and preferably includes paraformaldehyde.

The combination of formaldehyde and the thiocarbamate containing amide compound as described above may couple two amides or may result in the formation of a —CH$_2$OH on the nitrogen atom of the amide. Two of such amides with a —CH$_2$OH group thereon may then be reacted to form a coupled amide with the coupling group being

—CH$_2$OCH$_2$—.

The preparation of specific thiocarbamates (B) useful in this invention is illustrated in the examples that follow. In the following examples, and elsewhere in the present specification and claims, all parts and percentages are by weight, all temperatures are in degrees Celsius, and pressures are at or near atmospheric unless otherwise clearly indicated.

EXAMPLE 1

A 1-liter, 4-necked flask is fitted with a mechanical stirrer, thermometer, addition funnel and a water cooled reflux condenser. It is charged with 116 parts of 2-hydroxyethylacrylate and 76 parts CS$_2$. Dibutylamine (129 parts) is added over 3 hours with an exotherm to 47° C. The mixture is stirred for 2 hours. Heating is continued at 45–55° C. and held at this temperature for 2.5 hours. The mixture is cooled and vacuum stripped at 68° C. and 9 mm Hg. No distillate is collected. The reaction mixture is filtered through diatomaceous earth, and a clear yellow liquid is recovered.

EXAMPLE 2

A 1-liter flask is fitted with a mechanical stirrer, thermometer, addition funnel and a water-cooled, reflux condenser. The flask is charged with 71 parts of acrylamide and 60 parts of 95% ethanol. This mixture is stirred at room temperature for ¾ hour. An additional 40 parts of 95% ethanol is added to completely dissolve the acrylamide. To the solution is added 76 parts of CS$_2$. Diamylamine (157 parts) is added over 1.23 hours. An exotherm to 41° C. occurs. This mixture is heated and held at 50–55° C. for 3 hours. The mixture is subsequently vacuum stripped at 91° C. and 20mm Hg to yield 113 parts of distillate. The residue is filtered through diatomaceous earth filter aid with a filtrate yield of 281 parts of clear, yellow, viscous liquid. This represents a 92.4% yield based on a theoretical yield of 304 parts.

EXAMPLE 3

A 1-liter flask is fitted with a mechanical stirrer, thermometer, an addition funnel and a Dry Ice/isopropanol condenser. The flask is charged with 157 parts of diamylamine. Carbon disulfide (76 parts) is added while stirring the mixture. This addition produces an exotherm to approximately 55° C. in approximately 50 minutes. To the flask are added 50 parts of toluene after which 56 parts of acrolein are added at 25° C. over ¾ hour. This addition produces an exotherm to 45° C. The mixture is stirred and allowed to cool to room temperature for 6 hours. This mixture is then stirred for another 4.5 hours at 50° C. and allowed to stand overnight. The mixture is then vacuum stripped at 85° C. and 8mm Hg to give 64 parts of distillate. The residue is filtered through diatomaceous earth filter aid to give 240 parts of filtrate which is a clear, viscous red liquid. This represents an 83% yield based on 289 parts theoretical.

EXAMPLE 4

A 1-liter flask is fitted with a mechanical stirrer, thermometer, addition funnel and a water-cooled, reflux condenser. The flask is charged with 172 parts of methylacrylate and 152 parts of $CS_2$. This mixture is stirred at room temperature and 146 parts of diethylamine are added over 2.75 hours, producing an exotherm to 62° C. The mixture is then held at 55° C. for 2.50 hours and then allowed to cool while standing overnight. The reaction mixture is then stirred and heated to approximately 55° C. and held at that temperature for 2 hours. The mixture is vacuum stripped at 73° C. and 9mm Hg and the residue is filtered through diatomaceous earth filter aid to give 447 parts of a clear, brown filtrate. This represents a 95.1% yield based on a theoretical yield of 470 parts.

EXAMPLE 5

A 1-liter flask is fitted with a mechanical stirrer, thermometer, addition funnel and a water-cooled, reflux condenser. The flask is charged with 86 parts of methylacrylate and 76 parts $CS_2$. This mixture is stirred at room temperature, and 129 parts of dibutylamine are added. This addition takes place over 2 hours and produces an exotherm to 53° C. for 4 hours. The mixture is then vacuum stripped to 76° C. at 8mm Hg and the residue is filtered through diatomaceous earth filter aid to give 274 parts of a clear, yellow filtrate.

EXAMPLE 6

A 1-liter flask is fitted with a mechanical stirrer, thermometer, addition funnel and a water-cooled, reflux condenser. The flask is charged with 116 parts of 2-hydroxyethylacrylate and 76 parts $CS_2$. This mixture is stirred at room temperature and 157 parts of diamylamine are added over 1.3 hours. This addition produces an exotherm to 68° C. The mixture is allowed to cool for 0.75 hour and stand overnight. The mixture is then heated and stirred to approximately 60–65° C. for 2 hours, and then vacuum stripped at 98° C. and 10mm Hg. A trace of distillate is collected. The residue is filtered through 10 parts of diatomaceous earth to give 332 parts of a clear, yellow filtrate.

EXAMPLE 7

At 40° C., 76 parts of carbon disulfide are added dropwise over 0.75 hour to a mixture of 129 parts dibutylamine, 150 parts isopropyl alcohol and 10 parts of a 50% solution of sodium hydroxide. The reaction temperature is maintained between 25–40° C. for 1.5 hours, and then raised to 50° C. while adding incrementally 101 parts of N-hydroxymethyl acrylamide over one hour. The reaction temperature is raised to 70° C. and maintained for 3 hours. A 5mm vacuum is applied and the reaction temperature is raised to 130° C. The residue is filtered through diatomaceous earth, and the filtrate is the product.

EXAMPLE 8

At 40° C., 76 parts of carbon disulfide are added over 0.75 hour to a mixture of 129 parts of dibutylamine and 150 parts of isopropyl alcohol. The reaction temperature is maintained between 25–40° C. for 1.5 hours. When the reaction mixture is a clear yellow solution, 71 parts of acrylamide are added incrementally over one hour. The reaction temperature is raised to 70° C. and maintained for 3 hours. A 5mm vacuum is applied and the temperature is raised to 155° C. The residue is cooled to room temperature, and 33 parts of paraformaldehyde are added. The reaction temperature is raised to 90–100° C. under nitrogen and maintained for one hour. A 5mm vacuum is applied while raising the reaction temperature to 115° C. The residue is filtered through diatomaceous earth, and the filtrate is the desired product.

The organic lubricants (B) characterized by Formulae I and II preferably are free of acetylenic and aromatic unsaturation. Some compounds of Formulae I and II which contain such unsaturation may be insoluble in the fluorine-containing hydrocarbons. The soluble lubricants of this invention also are preferably free of olefinic unsaturation except that some olefinic unsaturation may be present so long as the lubricant is soluble.

The thiocarbamates of Formulae I and II are soluble in fluorine-containing hydrocarbons and, in particular, in the fluorohydrocarbons such as 1,1,1,2-tetrafluoroethane. The lubricants are soluble over a wide temperature range and, in particular, at low temperatures. The solubility of the lubricants in fluorohydrocarbons such as 1,1,1,2-tetrafluoroethane at low temperatures is determined in the following manner. The lubricant (0.5 gram) is placed in a thick-walled glass vessel equipped with a removable pressure gauge. The tetrafluoroethane (4.5 grams) is condensed into the cooled (−40° C.) glass vessel, and the contents are warmed to the desired temperature and mixed to determine if the lubricant is soluble in the tetrafluoroethane. If soluble, the temperature of the mixture is reduced until a separation and/or precipitate is observed. In this solubility test, the thiocarbamate lubricant of Example 5 is found to be soluble to −5° C.

The liquid compositions of the present invention comprise a major amount of a fluorine-containing hydrocarbon (A) and a minor amount of at least one soluble organic lubricant (B) comprising at least one organic thiocarbamate of Formulae I and II. By "major amount" is meant an amount greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70% to about 99% of the fluorine-containing hydrocarbon and from about 1 to about 30% by weight of the lubricant. In other embodiments, the liquid compositions of the present invention may contain from about 5% to about 20% by weight of the lubricant.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen.

The additives which may be included in the liquid compositions of the present invention to enhance the performance of the liquids include soluble extreme-pressure and anti-wear agents, oxidation and thermal-stability improvers, corrosion-inhibitors, viscosity-index improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic phosphates, organic alcohols, metal sulfonates, organic phosphites, etc. VI improvers include polyolefins such as polyisobutene, polymethacrylate, polyalkyl styrenes, etc. Pour point and floc point depressants include polymethacrylates, ethylene-vinyl acetate copolymers, succinic acid-olefin copolymers, ethylene-alpha olefin copolymers, etc. Detergents include sulfonates, long-chain alkyl-substituted aromatic sulfonic acids, phosphonates, phenylates, metal salts of alkyl phenols, alkyl phenol-aldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
|---|---|
| Example A | |
| 1,1,1,2-tetrafluoroethane (HCFC-134a) | 90 |
| Lubricant of Example 2 | 10 |
| Example B | |
| 1,1,2,2-tetrafluoroethane | 85 |
| Lubricant of Example 5 | 15 |
| Example C | |
| HCFC-134a | 95 |
| Lubricant of Example 5 | 5 |
| Example D | |
| HCFC-134a | 80 |
| Product of Example 7 | 20 |
| Example E | |
| HCFC-134a | 85 |
| Product of Example 8 | 15 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:
1. A liquid composition comprising:
  (A) a major amount of at least one fluorine-containing hydrocarbon containing one or two carbon atoms; and
  (B) a minor amount of at least one soluble organic lubricant comprising at least one organic thiocarbamate characterized by the formulae

$$R_1R_2NC(X)SC(R_3R_4)[C(H)(R_5)]_a Z, \text{ or} \quad (I)$$

$$[R_1R_2NC(X)SC(R_3R_4)[C(H)(R_5)]_a C(X)A]_2 Z' \quad (II)$$

wherein
$R_1$ and $R_2$ are each independently lower alkyl, aryl, aralkyl or together form a heterocyclic group in which the ring is completed through the nitrogen;
X is O or S;
A is O, S or NR;
R is H or a lower alkyl group;
$R_3$, $R_4$ and $R_5$ are each independently H, lower alkyl or aryl groups;
a is 0 or 1;
Z is —CN, —S(O)$R_6$, —S(O)O$R_6$, —S(O)$_2R_6$, —S(O)$_2$O$R_6$, or —C(O)Y;
$R_6$ is H, alkyl or aralkyl;
Y is H, —OH, —$R_7$, —O$R_7$, —O$R_8$OH, or —N$R_9R_{10}$;
$R_7$ is an alkyl, aryl or aralkyl group;
$R_8$ is an alkylene group of 1 to about 7 carbon atoms;
$R_9$ and $R_{10}$ are each independently H, alkyl, hydroxyalkyl, cycloaliphatic, or together form cyclic group in which the ring is completed through the nitrogen atom; and
Z' is —$R_8$— or —$R_8$—A—$R_8$—.

2. The liquid composition of claim 1 wherein fluorine is the only halogen in the fluorine-containing hydrocarbon (A).

3. The liquid composition of claim 1 wherein the fluorine-containing hydrocarbon (A) is 1,1,1,2-tetrafluoroethane.

4. The liquid composition of claim 1 comprising from about 70% to about 99% by weight of the fluorine-containing hydrocarbon (A) and from about 0.1 to about 30% by weight of the soluble organic lubricant (B).

5. The liquid composition of claim 1 wherein Z in Formula I is —COOR$_7$, wherein $R_7$ is an alkyl, or COOR$_8$OH, wherein $R_8$ is an alkylene group containing from 1 to about 7 carbon atoms.

6. The liquid composition of claim 1 wherein X in Formula I is S.

7. The liquid composition of claim 1 wherein a is 1 and $R_3$, $R_4$ and $R_5$ are hydrogen in Formulae I and II.

8. The liquid composition of claim 1 wherein, a is 0 and $R_3$ and $R_4$ are hydrogen in Formula I.

9. The liquid composition of claim 1 wherein $R_1$ and $R_2$ in Formula I are lower alkyl groups.

10. The liquid composition of claim 1 wherein the lubricant is characterized by Formula II, and Z' is —$R_8$—.

11. The liquid composition of claim 1 wherein the lubricant is characterized by Formula II, and each X is S and Z' is —$R_8$—.

12. The liquid composition comprising:
  (A) from about 70% to about 99% by weight of at least one fluorine-containing hydrocarbon containing or 1 or 2 carbon atoms; and
  (B) a minor amount of at least one soluble organic lubricant comprising at least one organic thiocarbamate characterized by the formula $$R_1R_2NC(X)SC(R_3R_4)C(H)(R_5)C(O)Y \quad (IA)$$

wherein

R₁ and R₂ are each independently lower alkyl groups or together form a heterocyclic group in which the ring is completed through the nitrogen;

X is O or S;

R₃, R₄ and R₅ are each independently H or lower alkyl groups;

Y is H, —OH, —R₇, —OR₇, —OR₈OH, or —NR₉R₁₀;

R₇ is a lower alkyl group;

R₈ is an alkylene group of 1 to about 7 carbon atoms; and

R₉ and R₁₀ are each independently H, alkyl, hydroxyalkyl, cycloaliphatic, Or together form a CyCliC group in which the ring is completed through the nitrogen atom.

13. The liquid composition of claim 12 wherein fluorine is the only halogen in the fluorine-containing hydrocarbon (A).

14. The liquid composition of claim 12 wherein the fluorine-containing hydrocarbon (A) is 1,1,1,2-tetrafluoroethane.

15. The liquid composition of claim 12 wherein X is sulfur.

16. The liquid composition of claim 12 wherein R₁ and R₂ in Formula IA are lower alkyl groups.

17. The liquid composition of claim 12 wherein R₃ and R₄ are hydrogen and R₅ is hydrogen or a lower alkyl group.

18. The liquid composition of claim 12 wherein Y is —OR₇ or —OR₈OH wherein R₇ is a lower alkyl group and R₈ is an alkylene group containing from 1 to about 7 carbon atoms.

19. The liquid composition of claim 12 wherein R₁ and R₂ are lower alkyl groups, X is sulfur, R₃ and R₄ are hydrogen and R₅ is hydrogen or a lower alkyl group.

20. A liquid composition comprising:
(A) from about 70% to about 99% by weight of at least one fluorine-containing hydrocarbon containing 1 or 2 carbon atoms and wherein fluorine is the only halogen present; and
(B) from about 0.1% to about 30% by weight of at least one soluble organic lubricant comprising at least one organic dithiocarbamate characterized by the formula $$R_1R_2NC(S)SC(R_3)(R_4)C(H)(R_5)C(O)Y \quad \text{(IB)}$$

wherein

R₁ and R₂ are each independently lower alkyl groups;

R₃, R₄ and R₅ are each independently H or lower alkyl groups;

Y is —OR₇, —OR₈OH, or —NR₉R₁₀;

R₇, R₉ and R₁₀ are each independently lower alkyl or hydroxyalkyl groups; and

R₈ is an alkylene group of 1 to about 7 carbon atoms.

21. The liquid composition of claim 20 wherein the fluorine-containing hydrocarbon (A) is 1,1,1,2-tetrafluoroethane.

22. The liquid composition of claim 20 wherein R₃ and R₄ are hydrogen and R₅ is hydrogen or a lower alkyl group.

23. The liquid composition of claim 20 wherein Y is OR₇ or —OR₈OH wherein R₇ is a lower alkyl group and R₈ is an alkylene group containing from 1 to about 7 carbon atoms.

24. A liquid composition comprising:
(A) a major amount of at least one fluorine-containing hydrocarbon containing 1 or 2 carbon atoms; and
(B) a minor amount of at least one soluble organic lubricant comprising at least one organic thiocarbamate derived from reactants which comprise
(1) CS₂, COS or a source material therefor;
(2) an amine of the formula $$R_1R_2NH \quad \text{(III)}$$

wherein

R₁ and R₂ are each independently lower alkyl, aryl, aralkyl or together form a heterocyclic group in which the ring is completed through the nitrogen; and (3) a reactant selected from reactants having the formulae $$R_3R_4C=C(R_5)Z \quad \text{(IV)}$$

or $$R_3R_4C(X')Z \quad \text{(V)}$$

or $$[R_3R_4C=C(R_5)C(X)A]_2Z' \quad \text{(VI)}$$

or $$[R_3R_4C(X')C(X)A]_2Z' \quad \text{(VII)}$$

wherein

R₃, R₄ and R₅ are each independently H or lower alkyl groups;

X' is a halogen;

X is O or S;

A is O, S, or —NR;

R is H or a lower alkyl;

Z is —CN, —S(O)R₆, —S(O)OR₆, —S(O)₂R₆, —S(O)₂OR₆, or —C(O)Y;

R₆ is H or a lower alkyl;

Y is H, —OH, —R₇, —OR₇, —OR₈OH, or

R₇ is a lower alkyl group;

R₈ is an alkylene group containing 1 to about 7 carbon atoms;

R₉ and R₁₀ are each independently H, lower alkyl, lower hydroxyalkyl, cycloaliphatic, or together form a heterocyclic group in which the ring is completed through the nitrogen atom;

Z' is —R₈— or —R₈—A—R₈—, and provided further that when reactant (3) is characterized by Formula V, the reaction is conducted in the presence of (4) a sufficient amount of at least one basic material to neutralize the HX' acid formed.

* * * * *